March 7, 1961 W. E. BROOKS 2,973,856
CONVEYOR
Filed April 9, 1958 7 Sheets-Sheet 1
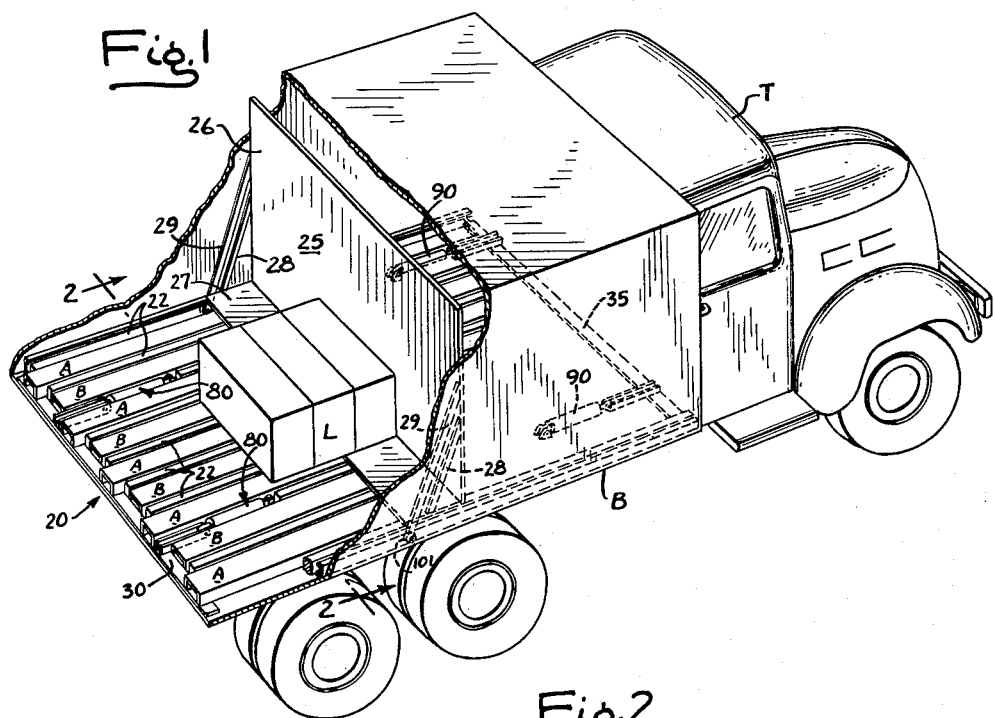
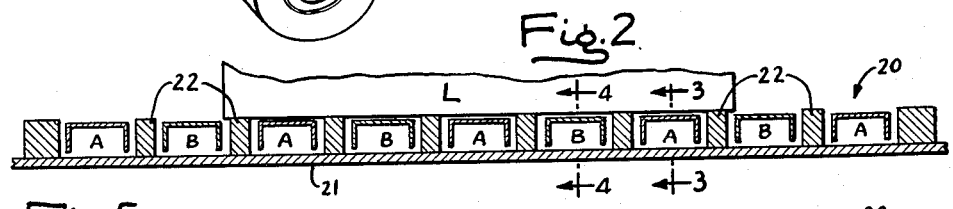
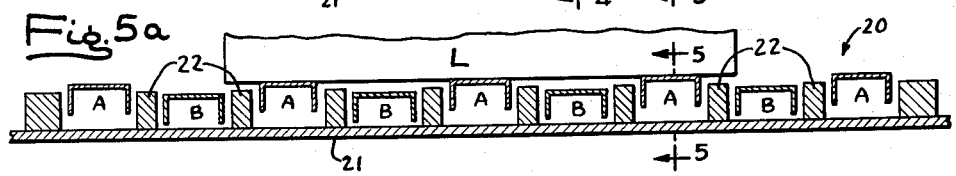
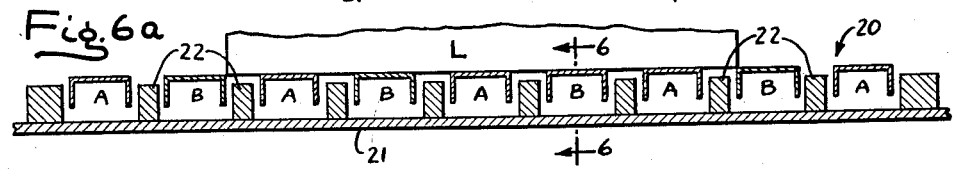
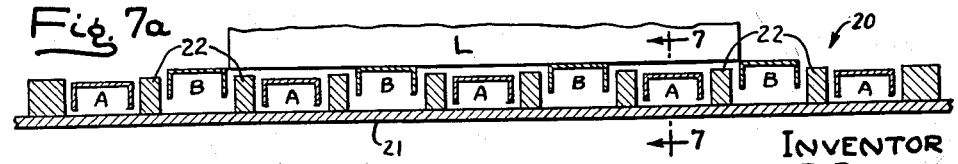
INVENTOR
WILL E. BROOKS
by: Carlson, Pitzner, Hubbard & Wolfe
ATTYS.

March 7, 1961 W. E. BROOKS 2,973,856
CONVEYOR
Filed April 9, 1958 7 Sheets-Sheet 2

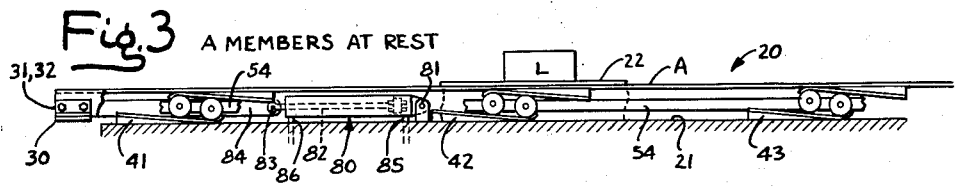

Fig.3 A MEMBERS AT REST

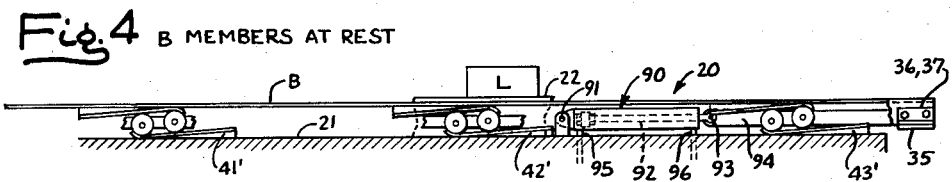

Fig.4 B MEMBERS AT REST

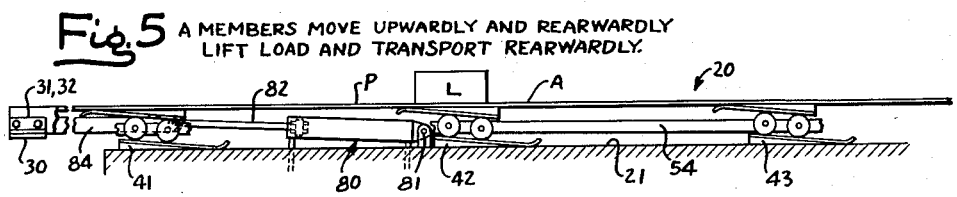

Fig.5 A MEMBERS MOVE UPWARDLY AND REARWARDLY
LIFT LOAD AND TRANSPORT REARWARDLY.

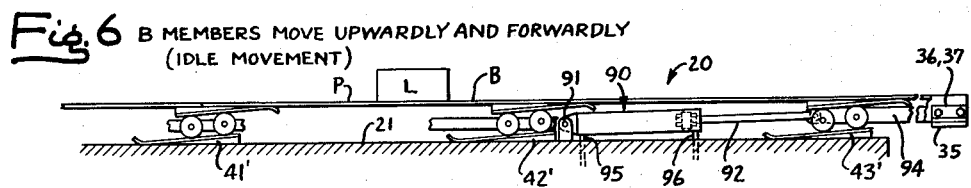

Fig.6 B MEMBERS MOVE UPWARDLY AND FORWARDLY
(IDLE MOVEMENT)

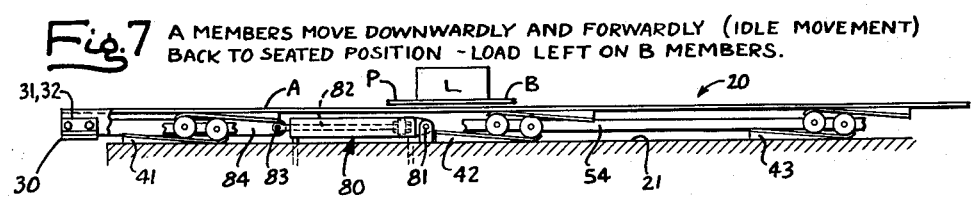

Fig.7 A MEMBERS MOVE DOWNWARDLY AND FORWARDLY (IDLE MOVEMENT)
BACK TO SEATED POSITION - LOAD LEFT ON B MEMBERS.

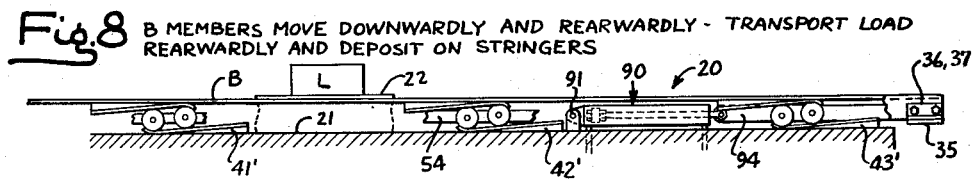

Fig.8 B MEMBERS MOVE DOWNWARDLY AND REARWARDLY - TRANSPORT LOAD
REARWARDLY AND DEPOSIT ON STRINGERS

INVENTOR
WILL E. BROOKS
by: Carlson, Pitzner, Hubbard + Wolfe
ATTYS

March 7, 1961 W. E. BROOKS 2,973,856
CONVEYOR
Filed April 9, 1958 7 Sheets-Sheet 3
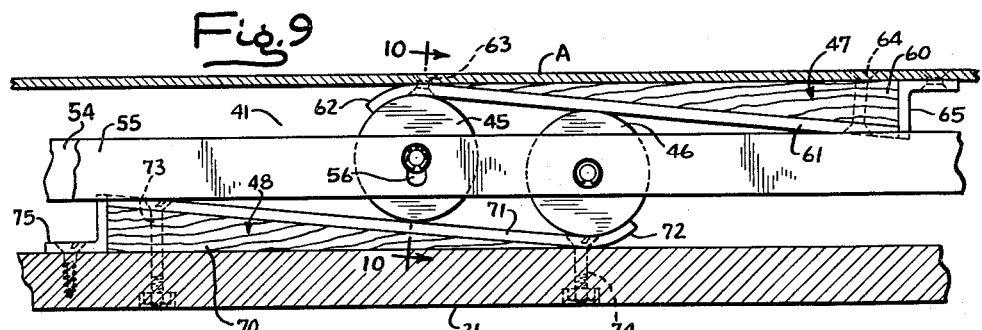
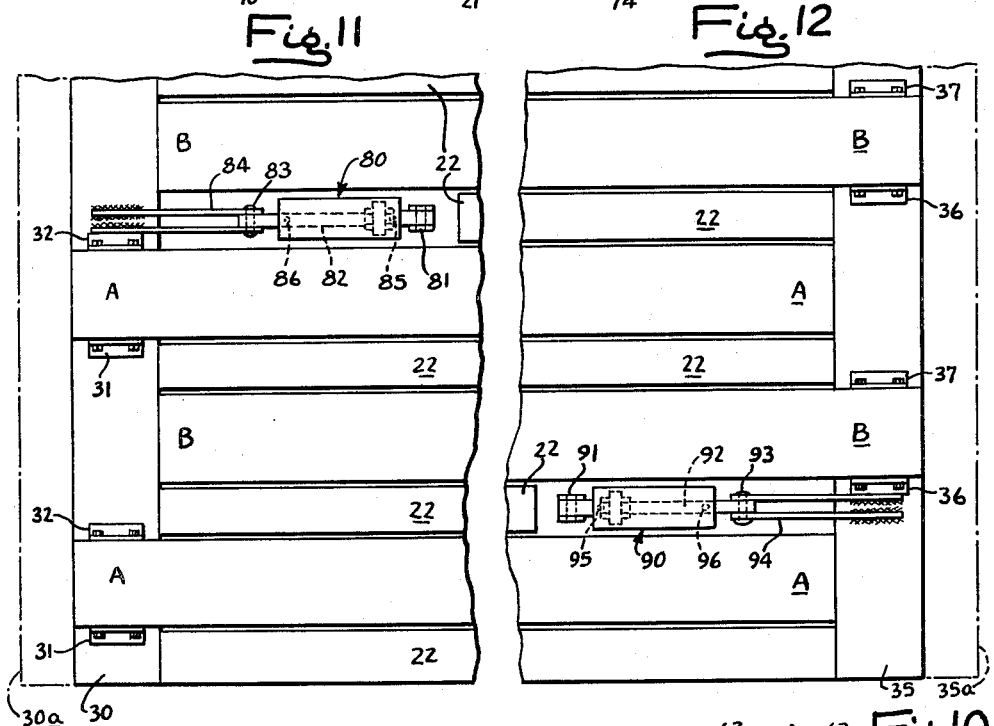
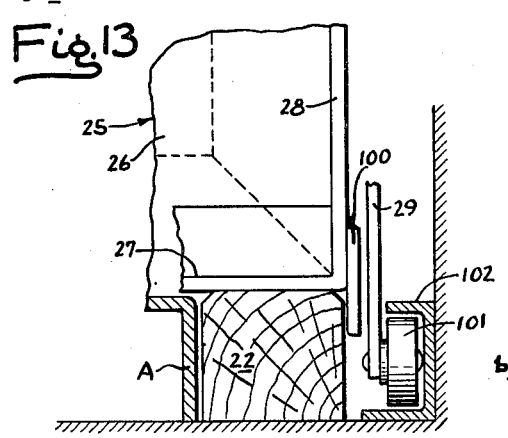
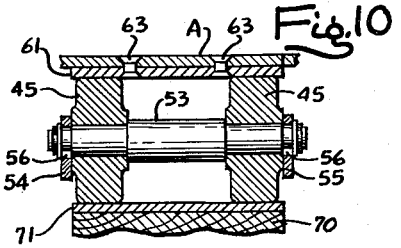
INVENTOR
WILL E. BROOKS
ATTYS

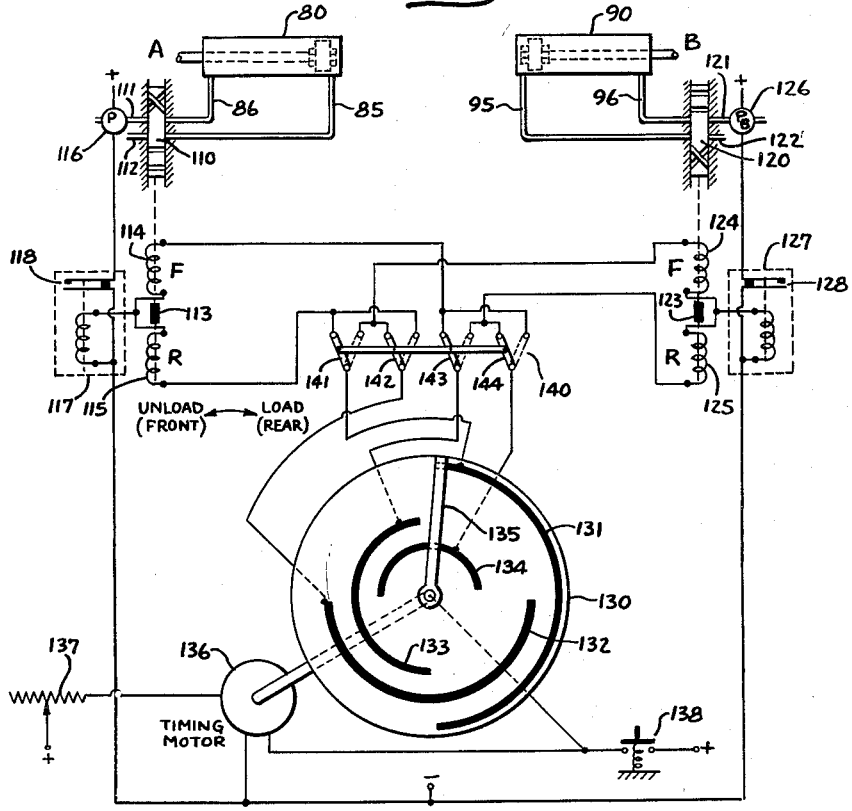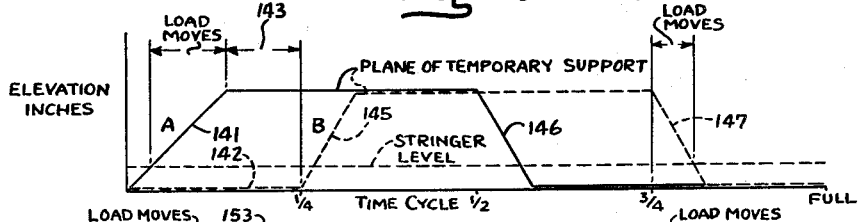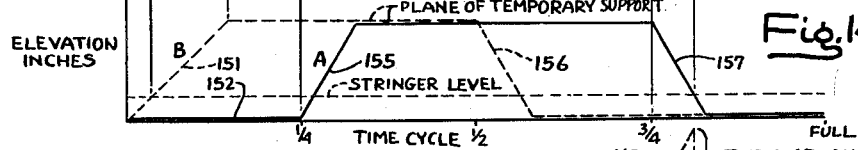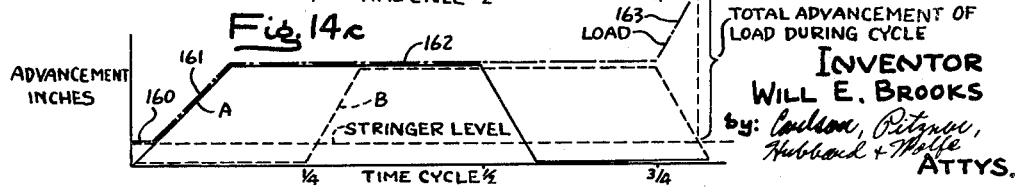

March 7, 1961  W. E. BROOKS  2,973,856
CONVEYOR
Filed April 9, 1958　　　　　　　　　　　　　7 Sheets-Sheet 5

INVENTOR
WILL E. BROOKS
by Carlson, Pitzner, Hubbard & Wolfe
ATTYS.

March 7, 1961 W. E. BROOKS 2,973,856
CONVEYOR
Filed April 9, 1958 7 Sheets-Sheet 6
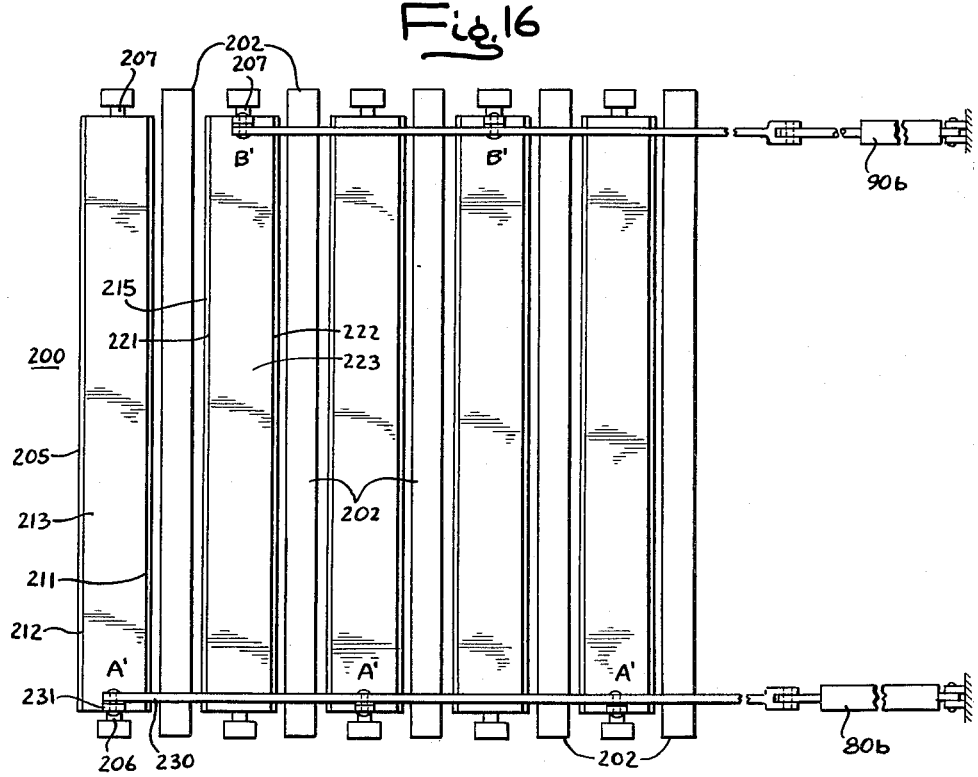
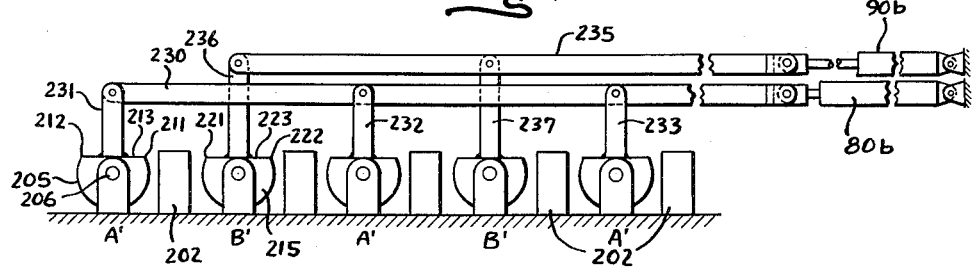
INVENTOR
WILL E. BROOKS
by: Carlson, Pitzner, Hubbard & Wolfe
ATTYS.

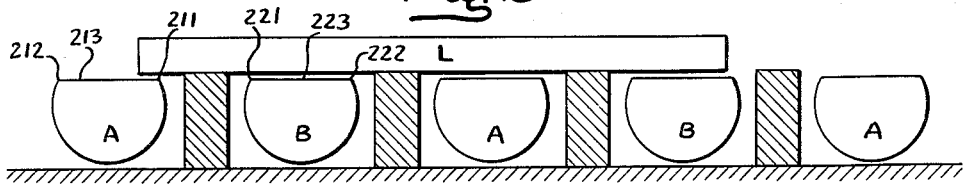
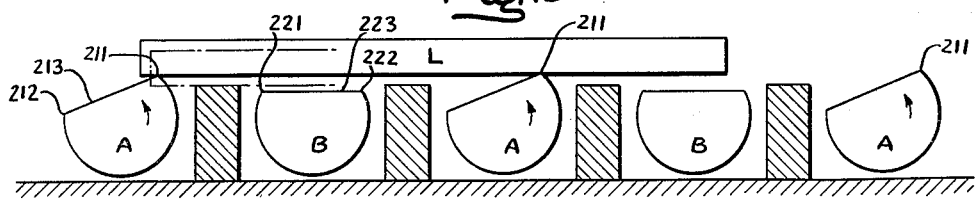
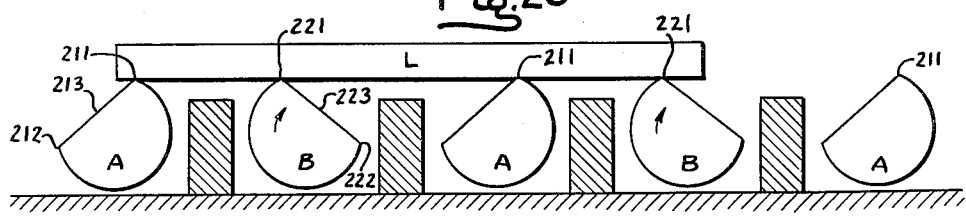
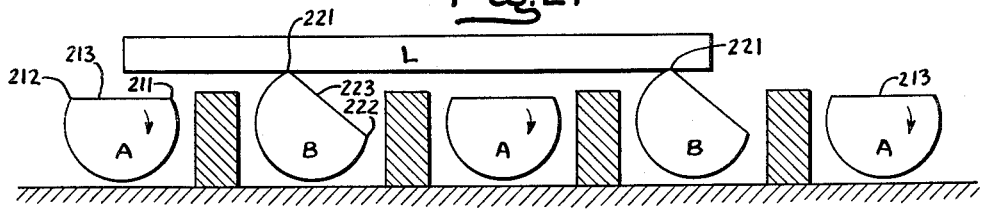
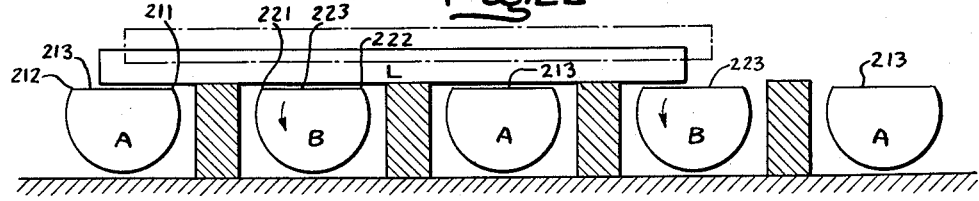

United States Patent Office 2,973,856
Patented Mar. 7, 1961

2,973,856
CONVEYOR

Will E. Brooks, Appleton, Wis., assignor to Precision Scientific Company, Chicago, Ill., a corporation of Illinois Filed Apr. 9, 1958, Ser. No. 727,428

19 Claims. (Cl. 198—219)

The present invention relates to conveyors and more particularly to a conveyor especially suited for loading and unloading trucks or the like.

It is an object of the invention to provide a conveyor especially suited for use in trucks and trailers, loading platforms and the like, which is capable of transporting heavy loads but which is simple, compact and inexpensive. It is a related object to provide a conveyor which requires a minimum sacrifice of headroom when used in a truck body or the like, on the order of 2″, and which is sufficiently low in cost as to enable installation on a universal and permanent basis in all of the trucks in a fleet. It is another object related to the foregoing to provide a conveyor arrangement which is versatile, applicable to any size or shape of bed, and which may be installed in trucks and trailers in the factory or later in the field with minimum installation expense.

It is a further object of the invention to provide a conveyor for use in trucks or the like which is mechanically efficient, which operates at a speed which is adequate for all loading and unloading operations, and which may be operated with minimum force, manually if desired. It is a still further object to provide a conveyor which has a minimum of moving parts and in which the load conveying members are roller mounted with a minimum of sliding friction. It is a related object to provide a conveyor which is especially suited for power actuation, requiring only light duty actuators for positive operation, actuators which may be powered from the regular truck battery without imposing any undue loading thereon, and susceptible to control by simple control devices, for example, of the electro-hydraulic type. It is another object to provide a conveyor which is fool-proof in operation, whether manually or power operated, which is non-binding and non-cocking, and which feeds evenly regardless of the width of the bed.

In one aspect of the invention it is an object to provide a conveyor in which the conveying members extend the entire length (or width) of the truck bed or the like, to engage all of the load simultaneously and evenly, and in which such members move through a short cyclical path in effecting step-by-step advancement of the load in either direction.

It is a further object to provide a conveyor including a novel and fool-proof cycling control system in which the load is moved in a continuous succession of closely spaced steps. It is another object to provide a control system for a conveyor of the above type in which the speed of movement may be conveniently controlled, and, if desired, adjustably coordinated with the speed of loading and unloading. In another aspect of the invention it is an object to provide a novel conveyor control system having a pair of alternatively operable conveyor elements moving between limit positions and in which the arrival at a limit position is employed for rapid and automatic recycling.

It is still another object to provide a conveyor which is especially suited for use in loading and unloading trucks and in which the load being transported rests directly on the truck bed rather than on the load conveying members so that such members are not subjected to the pounding and accelerational forces encountered when heavy loads must be driven over rough highways. Accordingly, it is an object to provide a conveyor which is distinguished by long life, a life which is equal to or greater than the life of the trailer or truck in which the device is used, and which permits use of lightweight conveying elements.

In another aspect of the invention it is an object to provide a novel barrier arrangement which operates in cooperation with the conveyor, which facilitates loading and maximum utilization of space, and which is particularly convenient in the handling and transport of partial loads.

Finally it is an object to provide a conveyor which is not only useful in trucks and loading platforms, but which is extremely versatile, having utility wherever it is desired to convey heavy loads progressively over a supporting bed as, for example, in a production line or the like.

Other objects and advantages of the invention become apparent upon reading the attached detailed description and upon reference to the drawings in which:

Figure 1 shows the present conveyor installed in the body of a truck with the body being broken away in order to reveal certain interior details.

Fig. 2 is a transverse fragmentary section taken along the line 2—2 in Figure 1.

Fig. 3 is a longitudinal view through a section of one of the conveying members and taken along the line 3—3 in Fig. 2.

Fig. 4 is similar to Fig. 3 but taken through the adjacent member along the line 4—4 in Fig. 2.

Figs. 5-8 are stop motion views showing the movements of the conveying members in a typical operating cycle.

Figs. 5a-7a are transverse sections under conditions corresponding to Figs. 5, 6 and 7.

Fig. 9 is an enlarged fragmentary section showing a typical roller and ramp assembly.

Fig. 10 is a section taken along the line 10—10 in Fig. 9.

Fig. 11 is a fragmentary plan view of one rear corner of the conveyor showing the yoke construction.

Fig. 12 is a view similar to Fig. 11 but showing the front corner.

Fig. 13 is a fragmentary transverse section showing the barrier mounting and hold-down construction.

Fig. 14 is a schematic diagram of an automatically cycling control arrangement.

Figs. 14a and 14b are elevation-time cycle diagrams for unloading and loading characteristic of the system in Fig. 14.

Fig. 14c is an advancement-time cycle diagram for the system in Fig. 14.

Fig. 16 is a plan view, partially schematic, of an alternate form of the invention employing rockable transverse members for conveying the load.

Fig. 17 is a side elevation of Fig. 16.

Figure 15:
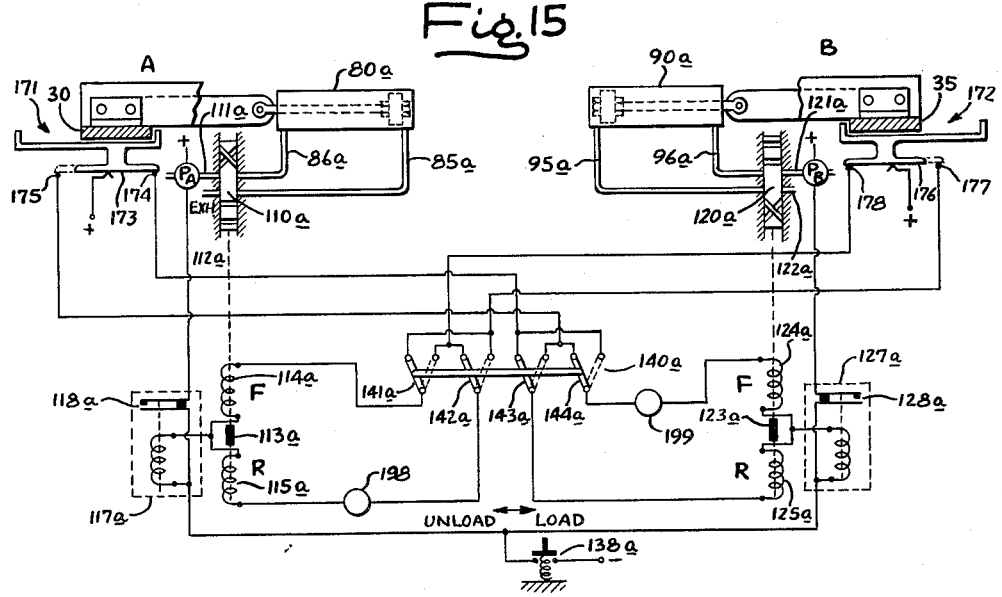
Fig. 15 is an alternate control system employing limit switches.

Figs. 18–22 comprise a set of stop motion views showing the operation of the alternate form of the invention.

While the invention has been described in connection with certain preferred embodiments, it will be understood that I do not intend to limit the invention to such embodiments but, on the contrary, intend to cover the various alternative and equivalent constructions and uses coming within the spirit and scope of the appended claims.

Referring to Figure 1, there is shown a truck T having a body B employing a conveyor 20 which is constructed in accordance with the present invention. As shown in transverse section in Fig. 2, the conveyor is of flat construction and may conveniently include a baseboard 21 formed of plywood or the like and which is co-extensive with the floor or bed of the truck body.

For the purpose of supporting a load during transport a plurality of longitudinal stringer members 22, in the present instance 10 in number, extend the length of the conveyor. These are suitably bolted or otherwise secured to the baseboard 21. As will be discussed in detail at a later point, the mode of fastening is preferably such as to enable limited lateral adjustment in order to insure clearance with respect to the conveyor members.

Also visible in Figure 1 is a barrier indicated generally at 25 having a vertical portion 26 and a horizontal skirt portion 27. The barrier is maintained upright by means of fixed struts 28 and auxiliary struts 29 which latter will be discussed in detail at a later point.

In accordance with the present invention, two sets of longitudinal load conveying members are provided which are arranged alternately side by side and which occupy a normal seated position with respect to the bed or baseboard, with novel provision for guiding and cycling such conveyor members through a limited distance along oppositely directed inclined paths for step-by-step conveying of the load. In the present instance the members comprising the first set are designated by the letter "A" and the members comprising the second set are designated by the letter "B." As shown in the sectional view the members A, B are formed of inverted channels made of steel, structural aluminum, or equivalent rigid material.

For the purpose of rigidly connecting together all of the A members for movement in unison, the latter are joined at their rear ends by a transverse yoke 30 having pairs of angles 31, 32 which are suitably bolted or welded to the walls of the channel members. At the opposite or forward end of the truck bed all of the members B are joined together by a transversely extending yoke 35, with the individual channel members being rigidly coupled thereto by means of angles 36, 37.

In carrying out the invention the channel members A are individually guided for translatory movement upwardly and rearwardly with respect to the truck bed. In the present construction, as shown in Fig. 3, this is accomplished by employing a plurality of roller and ramp assemblies, three of which are indicated at 41, 42, 43, respectively, the assembly 41 being taken as representative. In order to understand the details of the ramp and roller assembly 41, reference is made to Fig. 9. Here it will be noted that the assembly 41 includes a first pair of rollers 45 and a second pair of rollers 46 riding between ramps generally indicated at 47 and 48 respectively. Focusing attention first upon the roller details shown in Fig. 10, it will be noted that the pair of rollers 45 is made up of individually rotatable roller elements having an axle 53.

The ends of the axle are mounted in longitudinal straps or retaining members 54, 55. The straps or retaining members engage the axles of all of the rollers in the series as shown in Fig. 3. For convenience these members may be made up of shorter lengths of strap material bolted end to end. This insures that each roller set remains in step with all of the roller sets contained within a single one of the channels so that a full stroke of movement, without premature "bottoming" is assured. Preferably play is provided at one of the axles as indicated at 56 in order to insure that the pairs of rollers 45, 46 share the load equally between them.

Preferably the rollers are made of steel and bear upon hard metallic ramp surfaces. For minimum rolling friction combined with minimum weight, each of the ramps is of composite construction. Thus it may be noted that the ramp 47 includes a wedge block 60 having a steel face plate 61 which is bent over at its tip to provide a retaining lip 62 which engages the rollers 45 when the channel is seated in the position shown. For mounting the ramp in the channel rivets 63, 64 may be conveniently employed and for additionally blocking the ramp against movement, the heel of the ramp may be anchored by a suitable transversely extending angle as indicated at 65, welded or riveted in place.

The lower ramp 48, which is normally offset from the upper ramp is of similar construction having a wedge block 70, topped by a face plate 71 having a lip 72 and secured in place by suitable recessed bolts 73, 74, with endwise movement being prevented by a transverse angle 75.

It will be understood that each of the roller and ramp assemblies in the channels A is identical to that shown in Figs. 9 and 10. Such assemblies may be spaced at equal intervals within the channel, for example, at a spacing of 2 to 3 feet. Thus in the case of a truck having a bed length of 30 ft., approximately 15 roller assemblies will be employed. It will be apparent that when the channel A in Fig. 3 is forced endwise, the load engaging surface thereon with be translated upwardly and rearwardly, i.e., to the left, with the amount of elevation being constant along the entire length of the channel. Preferably the ramp angle is on the order of 6°. In a practical case a total channel movement may be 4" accompanied by a total channel rise of 7/16 inch.

Further carrying out the present invention, the second set of channel members designated B are provided with identical sets of roller and ramp assemblies but facing a direction opposite to the assemblies in the first set, so that upon applying suitable endwise force thereto the channel members move in unison upwardly and forwardly instead of upwardly and rearwardly. This reversal in direction is apparent in Fig. 4 which shows three of the roller and ramp assemblies designated 41', 42', 43'. The significance of this reversal in direction will be appreciated as the discussion proceeds.

Prior to reviewing a typical operating cycle, reference may be made to Figs. 11 and 12 which show the power actuators employed for moving the sets of channels or conveyor members endwise. Thus in Fig. 11 it will be noted that a double acting actuator 80 is employed which is anchored at its inner end to a suitable pivot 81 secured to the baseboard or bed of the truck. Slidable in the actuator is a piston rod 82 which is pivoted at its end 83 to bracket members 84 which are in turn welded to the yoke 30 previously referred to. The bracket members 84 may consist of a pair of vertically arranged plates which together form a box-like structure which is capable of applying force in compression as well as in tension. The actuator 80 has ports 85, 86 at its respective ends. Two identical actuators 80 are employed, one at each side of the truck bed (see Figure 1). Application of hydraulic fluid to the ports 85 is effective to cause the yoke to be moved rearwardly, i.e., to the left, a distance of approximately 4 inches to the limit position indicated at 30a. For the purpose of accommodating the actuators 80, it will be apparent from Fig. 11 that stringer members 22 in line therewith are simply foreshortened by a suitable amount. While the space between adjacent channels A, B is limited, nevertheless it is readily possible to develop adequate force for operating the present device positively under all conditions in the space available. The actuators may be covered if desired by inverted channels having the same cross-sectional dimensions as the stringers to provide load support in the region.

Similar means are employed at the forward end of the truck bed for operating the yoke associated with the channels B comprising the second set. A corresponding pair of double acting actuators 90 are provided each having an anchoring pivot 91, a piston rod 92, and coupled by a pivot 93 to a bracket 94. Fluid is conducted to the actuators, preferably through the conveyor bed via ports 95, 96. The actuators are capable of moving the yoke 35 from the position shown to the dotted limit position indicated at 35a. Throughout such movement the yoke simply slides along or slightly above the supporting baseboard.

Since it is possible to usefully employ the present conveyor without the automatic control means herein later described, a typical operating cycle may be understood simply by reference to Figs. 5–8 and assuming that force is applied to the yokes 30, 35 either by direct manual effort or by manual control of the fluid supplied to the actuators 80, 90 according to a predetermined operating cycle.

Referring to the stop motion views, it will be assumed that conveyance of a load L is desired in the rearward or unloading direction. To accomplish this rearward force is applied to the members A through the yoke 30 which causes all of the channels A to move upwardly and rearwardly on their roller and ramp assemblies as shown in Fig. 5. This causes the load L to be advanced in the unloading direction a distance of approximately 4 inches. During this advancement, because of the angle of the ramp, the channels are elevated to a distance of about $7/16$ inch. At this level the load-supporting, upper surfaces on the channels define what may, for convenience, be termed a plane P of temporary load support.

Following such advancement, the channels A are maintained stationary and the channels B are, by means of the actuators 90, moved forwardly, i.e., to the right as shown in Fig. 6. This takes up the clearance which previously existed between the channels B and the load, so that the channels move upwardly into the plane of temporary support to engage the load L.

After the load is engaged by the channels B, pressure is applied to the actuators 80 through the ports 86 to move the channels A endwise, to the right, back to their seated positions as shown in Fig. 7. This is an idle movement since, after the channels A begin to move, they are disengaged from the load, the load continuing to be supported in the plane P by the channels B.

For the final step of movement, the operating cycle is completed by rearward movement of the actuators 90 and yoke 35 to which the channels B are secured, so that the channels B roll down their associated ramps back into seated position. This movement of the channels along the ramps carries the load rearwardly an additional 4-inch step as shown in Fig. 8. Thus in a complete operating cycle the load is advanced approximately 8 inches. The cycle may then be repeated as many times as may be necessary to bring the load to the tail gate position.

The cycle described above in connection with Figs. 3–8 is that of a typical unloading operation, i.e., with the load being discharged to the left in Fig. 1. It is one of the features of the present device that the identical elements operating along the identical inclined paths of movement are employed for loading, the only difference being a change in the cycle of relative movement. It will be recalled that in the preceding discussion, the elements A rise first to the plane of temporary support, the load then being assumed by the elements B for further transport. In loading, this sequence is reversed, i.e., the elements B first move to the right in the loading direction, raising the load to the temporary plane of support P where the load is assumed by elements A for an additional step of movement. Briefly stated, this sequence is represented by a mirror image of Figs. 3–8, and with notations A and B interchanged.

In accordance with one of the aspects of the present invention, the channel members A and B, when in their lowermost positions, are so dimensioned with respect to the stringers 22 as to lie below the plane of the stringers by a small clearance on the order of $1/16$ to $1/8$ inch, the positions of the parts under transport conditions being shown in Fig. 2. It will be noted that this relationship insures that the load is borne solely by the stringers and is transferred directly to the baseboard 21 and the bed of the vehicle. It will be apparent from this that the channel members are protected under transport conditions from the accelerational loads which would be imposed thereon when the truck travels over rough terrain. The practical effect is that the channel members will remain straight and true with their efficiency unimpaired over the life of the vehicle. This, moreover, contributes to a light construction since the channel members may be designed to carry the maximum dead weight load only and need not be "beefed up" to resist the acceleration loading which will be encountered, for example, upon striking a large bump in the highway.

To provide lateral guidance for the channel members, they may have a loose sliding fit with respect to the set of ramps on the baseboard (see Fig. 10). This guidance, together with the rigid yokes 30, 35 at the ends of the channel members, insures that the sets of channels will be guided for movement in unison without any tendency for cocking or binding. To maintain equal clearance on each side the stringers may be bolted to the baseboard using oversize holes for limited lateral adjustment. And to reduce the friction of incidental contact between the stringers and the adjacent channels, the stringers may be oil-impregnated. As to the efficiency of movement of the channels on their guiding ramps, it will be appreciated by one skilled in the art that a roller operating against hard surfaces has negligible friction and resistance to movement. Consequently, practically all of the energy imparted to the channel members during movement of the load is useful energy, with only a minor fraction being dissipated in the form of friction.

Mention may be made of the fact that the force applied to the individual channels is divided evenly between all of the roller and ramp assemblies. This is due to the fact that the elevation of the channel is dependent upon the phase position of the cooperating ramps relative to one another, and since all of the movable ramps are firmly riveted to the channel and all of the fixed ramps firmly secured to the baseboard, it is inconceivable that any misphasing could occur either initially or as the result of a long period of usage. And since all of the sets of rollers under a given channel are rigidly tied together by the longitudinal straps 54, 55, no set of rollers can "get ahead of" any other set.

Prior to describing automatic sequencing means, more detailed mention may be made of the novel barrier construction which forms a part of the present invention. This barrier 25 which is shown in the general view (Figure 1) has a novel mounting means as shown in Fig. 13. At least part of the load will normally be placed upon the apron 27 of the barrier. In order to insure that the barrier remains centered during movement and to avoid any tendency toward cocking or binding, guide rails 100 are secured to the lateral edges of the apron and overhanging the adjacent stringers 22. Such guide rails may be in the form of metal straps extending longitudinally and suitably welded to the edge of the apron. In order to insure that the barrier remains upright and does not topple either forwardly or backwardly with light loads, auxiliary supporting members or brackets 29 are provided which terminate at their lower ends in rollers 101, respectively, which are captively received in longitudinally extending channels 102. During the conveying cycle the barrier 25 simply constitutes part of the conveyed load. For example, during loading the barrier 25 is moved outwardly to the tail gate and forms a vertical surface against which the load may be stacked. As the loading proceeds, the channel members are cycled as described so that the barrier 25 moves progressively inward. With a full load the barrier will occupy a maximum forward position, but where there is only a partial load, the barrier may occupy a position which is just sufficient to accommodate the load and to prevent unwanted shifting.

In accordance with one aspect of the invention a novel control arrangement is provided for producing automatic cycling of the sets of channel members between their limit positions and with the sets arriving at the plane of temporary support P in predetermined sequence for transfer of the load. It is proposed that this be accomplished by a cycling switch which is constantly recycled by a timing motor but under manual push button control. As is shown in Fig. 14, the rear actuators 80, of which one is shown, are fed by a 4-way valve 110 having a pressure inlet port 111 supplied by an electric pump PA, and an exhaust port 112, in addition to the ports which feed supply lines 85, 86 connected to the actuator. The valve plunger, which is schematically illustrated, may occupy a position as shown or two alternative end positions. To move the valve plunger, a double acting solenoid is provided, having an armature 113 normally centered but having alternatively energizable coils 114, 115. It will be apparent that when the pump PA is operating, movement of the armature and valve plunger upwardly by energization of coil 115 will cause the plunger of the actuator to move the set of A channels to the rear (left), while movement of the valve plunger in the opposite direction by energization of coil 114 will cause movement of the channels in the opposite direction. A series relay 117 having contacts 118 is used so that the pump turns on automatically when either of the coils 114, 115 is energized. The pump PA is equipped with an overload release valve to avoid creation of damaging forces when "bottoming" occurs in the actuator, as is conventional.

A valve 120 corresponding to the valve 110 is used for the front actuators 90, with corresponding reference numerals being employed, greater by 10.

In order to energize the coils 114, 115 and 124, 125 in a desired sequence, a time switch 130 is used having four contact segments 131, 132, 133, 134, a wiper arm 135, and a geared timing motor 136 therefor. For control of the speed of the timing motor, a rheostat 137 may be used. The common or wiper arm circuit is controlled by a push button 138; releasing the push button stops the conveying action.

In accordance with one of the more detailed aspects of the invention a "unload-load" switch 140 is interposed between the timing switch 130 and the solenoids, such switch having four poles 141, 142, 143, 144, cooperating with suitable double-throw contacts. The pushbutton 138 and switch 140 may be conveniently located within the body near the tail gate.

The operation of the control arrangement in Fig. 14 during a typical unloading cycle may be understood by following the simplified wiring diagram and with reference to Fig. 14a. Depressing the manual push button 138 energizes the wiper arm 135 which is positioned to apply voltage to sectors 131, 134 on the switch. This energizes the coil 115 in the rear solenoid and turns on the pump PA so that pressure fluid is supplied through the line 85 moving all of the A channels upwardly and rearwardly in the unloading direction. In accordance with one of the features of the circuit, all of the channels B, during the movement of channels A, are securely locked in their inactive left-hand positions. This is accomplished by the contact segment 134 which, through switch 144, energizes the coil 125 in the front solenoid as well as the pump PB, so that pressurized fluid is supplied through the line 96, tending to hold the plunger of the actuator in the position shown.

Referring to Fig. 14a, elevation of the channels A is indicated at 141, while the channels B remain stationary as indicated at 142. Preferably, the quarter-cycle interval is sufficiently long so that the actuators 80 may fully reach their limits of movement, the time margin being indicated at 143.

At the end of the first quarter-cycle the contact segment 132 in the switch 130 is engaged, thereby energizing the winding 124 of the solenoid valve 120. This causes movement of the valve plunger so that pressurized fluid is supplied through the line 95. Thus all of the channels B are free to move in unison in the forward or right hand direction. Since this is an idle movement, with the channels B being unloaded, the movement, indicated at 145, occurs somewhat more rapidly than the preceding movement of the channels A. During movement of the channels B the channels A are locked in position by reason of the continued energization of the coil 115 in the control valve. At the end of the first half cycle, both sets of channel members occupy their upraised positions shown respectively in Figs. 5 and 6.

As the wiper swings beyond 180° position, contact segment 133 is engaged and the contact 131 disengaged causing the solenoid valve 110 to be reversed in position so that the channels A move inwardly and downwardly, this being indicated by line 146 in Fig. 14a. This movement takes place rather promptly since the channels A are, by this time, unloaded, the load having been assumed by the channels B while both sets of channels were in the upraised position. The channels B are temporarily locked in the upraised position by the continued energization of the coil 124 in the solenoid controlling the actuators 90. Finally, at the three-quarter position of the switch, the contact 134 is engaged, and the contact 132 disengaged thereby causing reversal of the solenoid valve 120 and a lowering of the load by the channels B accompanied by an additional step of unloading movement. This final movement of the channels B is indicated at 147 in the time diagram. Finally at the end of the cycle the B channel members occupy the position shown in Fig. 8 with the load being restored to the stringers. The cycle serves to advance the load approximately 8 inches in the loading direction, and the cycle is then repeated by a subsequent revolution of the wiper arm 135 in the switch.

To accomplish loading, the double-throw switch 140 is switched to its opposite position so that the conveying members B first arrive at the plane of temporary support followed in sequence by the members A. It will be unnecessary to repeat the description of the operation with the switch 140 in its opposite position, and it will suffice for one skilled in this art to say that movement of the two sets of conveying members occurs analogously and in accordance with the cycle shown in Fig. 14b. In this figure, corresponding conditions are indicated by corresponding reference numerals, greater by 10.

While Figs. 14a and 14b clearly illustrate the operation, it must be kept in mind that these are "elevation" diagrams and do not directly show the advancement of the load which occurs during the cycle. In order to show such advancement directly, reference is made to Fig. 14c; the load movement being indicated by the heavy dot-dash line. Note that at the beginning of the unloading cycle, for example, there is a certain small amount of lost motion as indicated at 160 to take up stringer clearance. This is followed by a first step of load advancement 161. Load transfer takes place over the interval 162, with a final step of movement 163.

In accordance with one of the aspects of the invention automatic cycling of the two sets of channels is accomplished by limit-actuated means directly coupled to the channels.

In the present instance this is brought about by limit switches 171, 172 coupled to the yokes 30, 35 respectively. Taking the limit switch 171 by way of example, it will be noted in Fig. 15 that it includes a slider 173, a front contact 174 and rear contact 175. Provision is made for lost motion so that switching occurs only as the yoke moves into its respective limit positions. The switch 172 is a mirror image of that shown at 171, including a slider 176, a front contact 177 and a rear contact 178. The other control elements in Fig. 15 correspond substantially to those shown in Fig. 14 and carry the same reference numerals with addition of subscript "a."

Figure 15A:
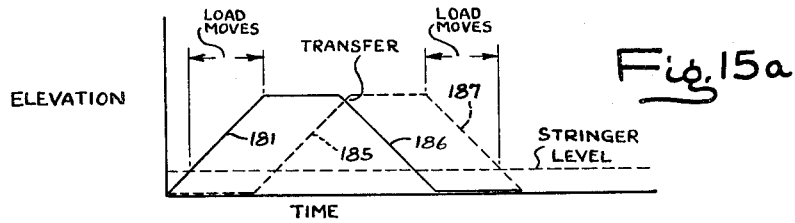
Figs. 15a and 15b are elevation-time cycle diagrams applicable to the system of Fig. 15.

Operation of the circuit shown in Fig. 15 during a typical unloading cycle will be apparent upon following through the disclosed circuitry and upon reference to the elevation-time diagram, Fig. 15a. Thus when the push button 138a is depressed, winding 115a is energized by contact 178 causing the armature 113a to be drawn downwardly thereby pressurizing the supply line 85a, and causing rearward movement of the channels A. During this movement channels B are locked in seated position, since the winding 125a in the associated solenoid valve is energized by the contact 174. Movement of the channels A is indicated in Fig. 15a at 181. As channels A reach their limit of rearward movement, contact 174 is broken and contact 175 is made causing reversal of the solenoid valve 120a associated with the actuator 90a and immediate movement of the channels B in the forward direction as indicated at 185. When the channels B reach their forward limit position, contact 178 is broken and contact 177 is made thereby causing reversal of the solenoid valve 110a so that the channels A are again drawn inwardly, i.e., to the right, and lowered into seated positions as indicated at 186 in Fig. 15a. As soon as this movement is completed, the making of contact 174 and the breaking of contact 175 causes reversal of the actuator 90a so that it, too, is restored to its original position as indicated at 187, completing one cycle of movement. The corresponding advancement of the load during this cycle is shown in Fig. 15c.

Figure 15B:
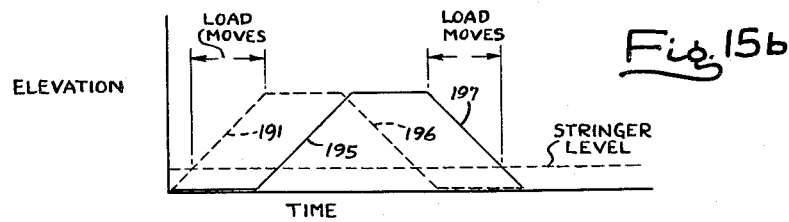
Figure 15C:
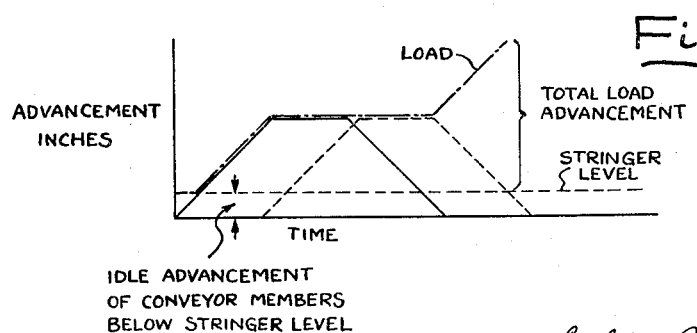
Fig. 15c is an advancement-time cycle diagram applicable to Fig. 15.

To reverse the cycle for loading, the double-throw switch 140a is switched to its opposite position so that the cycle of movement becomes that shown in Fig. 15b, corresponding movement being indicated by corresponding reference numerals plus 10.

It will be apparent that the cycle shown in Fig. 15a is shorter than that shown in Fig. 14a, since the movements are self-timing and since there is no need to provide a margin to insure response such as indicated at 143 in Fig. 14a. In order to insure that the members A and B are all restored to their seated positions at the end of the cycle, auxiliary switches 198, 199 may be used. In practice, the switch 198 may be opened sometime during the last desired unloading cycle thereby bringing the cycle to an end upon completion of the movement of the channels B and without instituting additional movement of the channels A. When the system comes to rest the push button 138a may be released and the switch 198 closed in readiness for an ensuing control cycle. The switch 199 may be similarly employed to terminate cycle of loading movement.

It is one of the inherent features of the present construction that the same basic conveying elements may be adapted to any size or shape of bed. That is to say, where it is necessary to accommodate the device to a wider bed, this can be accomplished by simply using wider yokes and adding additional "standard" channels to fill out the width. And where it is necessary to lengthen or shorten the conveyor for different application, this is a simple matter of cutting the channels to length or bolting on additional sections of channel end-to-end with their necessary roller and ramp assemblies.

*Alternate embodiment*

While the invention has been discussed above in connection with sets of longitudinally extending conveying members, it will be apparent to one skilled in the art that the invention, in certain of its broader aspects, is not limited thereto but includes the embodiment shown more or less diagrammatically in Figs. 16 and 17. In this embodiment transversely extending rocker members A' and B' are employed interspersed with one another and separated by stringers 202. Taking the rear-most rocker member 205 by way of example, it will be noted that it is rockingly pivoted on trunnion bearings 206, 207. Lying on respective sides of the bearing axis are load engaging surfaces 211, 212 respectively, having a radius such that when the member 205 rocks counter-clockwise the load is engaged by the surface 211 and when the member rocks clockwise the load is engaged by the surface 212 for lifting and transport in the respective directions.

In the alternate embodiment the member 205 preferably comprises a tube which is provided with a flat 213 positioned slightly below the level of the stringers 202. Thus when the load conveying member 205 is in the position shown, the load is supported entirely by the stringers 202, analogously to the first embodiment.

Taking a typical load conveying member B shown at 215, it will be noted that it includes the first load engaging surface 221, a second load engaging surface 222 spaced on the opposite side of the axis, and a flat 223.

For the purpose of rocking all of the conveying members A' simultaneously, a longitudinally extending yoke member 230 is provided which is pinned to upwardly extending arms 231, 232, 233, engaging an actuator 80b at the front end for rocking the conveying members A'. To rock the members B', a yoke 235 is provided pinned to arms 236, 237 on such members. At its forward end the yoke 235 is connected to an actuator 90b. The actuators 80b, 90b may be supplied and controlled by an arrangement which is the same as that shown in Figs. 14 and 15 with the hydraulic connections to the actuator 90b simply being reversed to provide corresponding functional movement.

In order to fully understand the manner in which the rocking members A' and B' function sequentially for step-by-step advancement of the load, reference is made to Figs. 18–22. These figures correspond to Figs. 3 and 5–8 which were discussed earlier. The first step of movement shown in Fig. 19 causes the load to be raised by the load engaging surfaces 211 so that the load is raised and transported to the left as indicated by the dotted and full lines respectively. Following this, the B' members are rocked clockwise, with the load being engaged by the surfaces 221 thereon as shown in Fig. 20. Following this, the members A' are restored to their original positions, leaving the load supported by the members B', Fig. 21. Finally, the B' members are rocked counter-clockwise resulting in lowering and further advancement of the load; see the dotted and full lines in Fig. 22. For reversing the direction of the movement, the members A' and B' are cycled in opposite sequence. In the alternate embodiment the amount of forward movement will be substantially less than that described in the earlier embodiment, on the order of 1 inch or less per cycle. This simply requires that the members undergo more cycles for the same amount of movement. In general, it will be found that the embodiment illustrated in Figs. 16 and 17 is suited for smaller areas and lighter loads than that described earlier.

It will be apparent from the above that I have provided the conveyor mechanism which carries out all of the objects and which possesses all of the features and advantages set forth at the beginning of this discussion.

In the following claims the terms "conveying members" and load "supporting surfaces" appearing in the generic claims may be applied to the surfaces 211, 212 and 221, 222 respectively, in the second embodiment and the normal positions occupied thereby may be referred to as the "seated" positions.

I claim as my invention:

1. In a conveyor the combination comprising a longitudinal bed, a first load conveying member on said bed, a second load conveying member on said bed adjacent said first member, means for guiding said first conveying member for angular movement upwardly from a seated position and forwardly with respect to said bed, and means for guiding said second conveying member for angular movement upwardly from a seated position and rearwardly with respect to said bed, said load conveying members being at substantially the same level relative to the bed in their seated and upraised limit positions respectively, and control means for cyclically moving said members between their limit positions so that they reach their upraised positions in sequence for conveying a load step-by-step along said bed.

2. In a conveyor the combination comprising a bed, a plurality of longitudinal stringer members extending lengthwise along said bed for normally supporting a load and defining grooves there between, a first set of longitudinal conveying members seated in alternate grooves and interconnected for movement in unison, a second set of longitudinal conveying members seated in the remaining grooves and interconnected for movement in unison, roller and ramp means on the underside of said members so that endwise movement thereof between limit positions is accompanied by vertical movement of the members from their seated positions to a level above said stringer members and defining a plane of temporary load support, the ramps associated with the respective sets of said members being faced oppositely, actuators coupled to said sets of members, and means for cycling said actuators with sequential phasing so that said load is transferred from one set of members to the other at said plane of temporary support for step-by-step advancement of the load along the bed.

3. In a conveyor the combination comprising a bed, a first load conveying member normally seated on said bed, a second load conveying member normally seated on said bed at substantially the same level as said first member, means for guiding said first conveying member for movement angularly upward from said bed in one direction there along to an upper limit position, means for guiding said second conveying member angularly upward from said bed in the opposite direction to an upper limit position in substantial alignment with said first member, and control means for cyclically moving said members between their seated and upraised limit positions so that they reach their upraised limit positions in sequence for conveying a load resting on said members.

4. In a conveyor the combination comprising a bed, a first load conveying member normally seated on said bed, a second load conveying member normally seated on said bed at substantially the same level as said first member, means including rollers for guiding said first conveying member for movement angularly upward from said bed in one direction there along to an upper limit position, means including rollers for guiding said second conveying member angularly upward from said bed in the opposite direction to an upper limit position in substantial alignment with said first member, and control means for cyclically moving said members between their seated and upraised limit positions so that they reach their upraised limit positions in sequence for conveying a load resting on said members, the rollers associated with each conveying member being tied together for movement in unison.

5. In a conveyor the combination comprising a bed, a first set of conveying members supported on said bed, a second set of conveying members supported on said bed and interspersed between said first members, means for guiding said first set of members for angular movement upwardly and forwardly with respect to said bed to an upraised limit position defining a plane of temporary load support, means for guiding said second set of members for angular movement upwardly and rearwardly with respect to said bed and to said plane of temporary load support, and control means for cyclically moving said members into said plane in sequence for conveying a load resting on said members.

6. In a conveyor the combination comprising a bed, first and second movable load conveying members supported in seated positions with respect to said bed and lying adjacent to one another, means for guiding said first conveying member so that it moves angularly upward from a seated position in a first direction along said bed to an upper limit position, means for guiding said second load conveying member so that it moves angularly upward from a seated position in a direction along said bed opposite the movement of said first member to an upper limit position which is substantially at the same level as the upper limit position of said first member, and control means for cyclically moving said members so that (a) said first member moves to its upper limit position, (b) said second member moves to its upper limit position, (c) said first member moves back to its seated position, and (d) said second member moves back to its seated position, for conveying a load in said first direction.

7. In a conveyor the combination comprising a bed, load-supporting stringer members arranged on said bed in parallel spaced relation defining longitudinal grooves therebetween, first and second sets of longitudinal conveying members arranged in alternate grooves respectively between said stringer members, said conveying members having a normal seated position at a level just slightly below the level of said stringer members so that the load is normally supported on said stringer members, means for guiding said first set of conveying members for movement in unison so that a load engaging longitudinal surface thereon is moved angularly upward in one direction along the bed from the seated position to a plane of temporary load support which lies above said stringer members, means for guiding said second set of conveying members in unison so that a load engaging longitudinal surface thereon is moved angularly upward in the opposite direction along said bed from the seated position to said plane of temporary support, power actuators coupled to said sets of conveying members respectively, and control means for cycling said power actuators so that (a) said first set of conveying members is moved to said plane for a first step of load movement, (b) said second set of conveying members is moved to said plane idly to assume the load carried by said first set of members, (c) said first set of members is idly returned to the seated position; and (d) said second set of members is returned to the seated position for a second step of movement of the load.

8. In a conveyor the combination comprising a bed, a first set of longitudinal load conveying members extending lengthwise along said bed, a second set of longitudinal load conveying members extending lengthwise along said bed and interspersed between the members in said first set, first and second yoke means for connecting together all of the members comprising a set, means for guiding said first set of load conveying members for translatory movement along an angular path forwardly and upwardly from said bed between a seated position and an upraised position, means for guiding said second set of load conveying members for translatory movement along an angular path upwardly and rearwardly from a seated position to an upraised position, power actuators connected to the respective yoke means, and control means for cycling said power actuators so that the sets of members reach their upraised positions in sequence for conveying of a load longitudinally along said conveying members.

9. In a conveyor the combination comprising a bed, a first longitudinal load conveying member extending lengthwise along said bed, a second longitudinal load conveying member extending lengthwise along said bed and lying adjacent said first member, first ramp means including a plurality of ramp members spaced along the underside of said first load conveying member and so arranged that said first conveying member is guided for translatory movement in a forward direction and upwardly from said bed to a limit position, second ramp means including a plurality of ramp members spaced along the underside of said second load conveying member and so arranged that said second conveying member is guided for translatory movement in a rearward direction and upwardly from said bed to a limit position, power actuators associated with said first and second conveyor members respectively, for moving the same between their limits of movement, and control means for cycling said power actuators out of phase with one another so that said conveying members transfer the load from one to the other near the top of their cycles of movement for step-by-step advancement of the load along said bed.

10. In a conveyor the combination comprising a bed, a first channel member extending lengthwise along said bed, a second channel member extending lengthwise along said bed adjacent said first member, roller and ramp means spaced at intervals along the underside of said first channel member and so arranged that such member is guided for translatory movement rearwardly and upwardly from said bed, second roller and ramp means spaced at intervals along the underside of said second channel member and so arranged that such member is guided for translatory movement forwardly and upwardly from said bed, power actuators associated with said first and second channel members, respectively, for moving the same between their limits of translatory movement, and control means for cycling said power actuators out of phase with one another so that said channel members transfer the load from one to the other near the top portion of their cycles of movement for step-by-step advancement of the load.

11. In a conveyor the combination comprising a bed, a first set of inverted channel members extending lengthwise along said bed, a second set of inverted channel members extending lengthwise along said bed and interspersed between the members of the first set, means including ramps spaced at intervals along the undersides of the channels comprising said first set so angled that endwise force applied thereto in one direction moves the first set of channels endwise and upwardly from said bed, means including ramps spaced at intervals along the undersides of the channels comprising said second set so angled that endwise force applied thereto in the opposite direction moves the second set of channels in the opposite direction and upwardly from said bed, power actuators associated with said sets of channels respectively for moving said channels between their limits of movement, and control means for energizing said actuators out of phase with one another so that a load straddling said channels is progressively conveyed therealong.

12. In a conveyor the combination comprising a bed, a first set of rocker members extending transversely across said bed and mounted for rocking movement, a second set of rocker members extending transversely across said bed and mounted for rocking movement interspersed with the members in the first set, the rocker members in said first set having a load supporting edge thereon which is moved in one direction along the bed and upwardly from the bed to a plane of temporary support during rocking movement, the rocker members in the second set having a load supporting edge thereon which is moved in the opposite direction along the bed and upwardly from the bed to the plane of temporary support during rocking movement, and means for rocking the rocker members of each set through a rocking cycle out of phase so that they reach the plane of temporary support in succession whereby a load supported on said rocker members is moved step-by-step along said bed.

13. In a conveyor the combination comprising a bed, a set of stringer members extending transversely across said bed and spaced to define grooves therebetween, a first set of rocker members in alternate grooves and mounted for rocking movement, a second set of rocker members in said remaining grooves mounted for rocking movement and interspersed with the members in the first set, the rocker members in said first set having a load supporting edge surface thereon which is moved in one direction along the bed and upwardly from the bed to a plane of temporary support above the level of the stringers during rocking movement, the rocker members in the second set having a load supporting edge surface thereon which is moved in the opposite direction along the bed and upwardly from the bed to the plane of temporary support during rocking movement in the opposite direction, and means for rocking the rocker members of each set through a rocking cycle out of phase so that they reach the plane of temporary support in succession whereby a load supported on said stringer members is moved step-by-step along said bed.

14. In a conveyor the combination comprising a bed, a first set of tubular conveying members extending transversely across said bed, a second set of tubular members extending transversely across said bed and interspersed with the members in said first set, each of said tubular members having a flat thereon defining a load supporting edge, all of the flats being in substantial alignment under normal conditions to define a flat position, means for rocking the tubular members in the first set back and forth about their axes from the flat position to a forwardly canted limit position defining a plane of temporary support for said load, and means for rocking the tubular members in the second set back and forth about their axes from the flat position to a rearwardly canted limit position in said plane of temporary support sequentially with respect to said first set for step-by-step conveyance of the load along said bed.

15. In a conveyor the combination comprising a bed, having transversely extending load supporting stringers thereon defining grooves therebetween, a first set of longitudinal conveying members in alternate ones of said grooves, a second set of longitudinal conveying members in the remaining ones of said grooves, said load conveying members in said first set being mounted for rocking movement and having a load supporting edge thereon which is rocked from a position below the level of the stringers upwardly and forwardly along said bed to define a plane of temporary support above the level of the stringers, said longitudinal conveying members in said second set being mounted for rocking movement and having a load supporting edge thereon which is rocked from a position below the level of the stringers upwardly and rearwardly along said bed to said plane of temporary support, and power means for cyclically rocking said sets of members with sequential phasing so that they arrive at the plane of temporary support in sequence and so that a load is advanced in steps along said bed.

16. In a conveyor the combination comprising a longitudinal bed, a first set of load conveying members on said bed and laterally spaced from one another, a second set of load conveying members on said bed interspersed between the members of said first set, said sets of load conveying members having load-supporting surfaces thereon, means for guiding said first conveying member for angular movement of the load-supporting surface upwardly from a seated position and forwardly with respect to said bed, means for guiding said second conveying member so that the load-supporting surface thereon moves angularly upwardly from a seated position and rearwardly with respect to said bed, double acting power actuators respectively coupled to said sets of load conveying members for moving the same between their limit positions forcibly in both directions, and control means for controlling said actuators so that the sets of load conveying members reach their upraised positions in sequence for conveying a load step-by-step along said bed.

17. In a conveyor the combination comprising a longitudinal bed, a first set of longitudinal members extending along said bed and arranged side by side in spaced relation, a second set of longitudinal conveying members on said bed interspersed between said first members, first and second power actuators coupled to said sets of conveying members respectively for reciprocating the same between limits of movement, said first set of conveying members having means for guiding the same angularly upward from said bed incident to longitudinal movement in one direction, said second set of conveying members having means for guiding the same angularly upward from said bed incident to longitudinal movement in the opposite direction, actuators for said sets of members respectively, and limit stop means responsive to said members reaching their limit positions for causing said actuators to be cyclically operated so that said sets of load conveying members reach their upraised positions in sequence for conveying a load step-by-step along said bed.

18. In a conveyor the combination comprising a longitudinal bed, a first set of longitudinal members extending along said bed and arranged side by side in spaced relation, a second set of longitudinal conveying members on said bed interspersed between said first members, first and second power actuators coupled to said sets of conveying members respectively for reciprocating the same between limits of movement, said first set of conveying members having means for translating the same angularly upward from said bed incident to longitudinal movement in one direction, said second set of conveying members having means for translating the same angularly upward from said bed incident to longitudinal movement in the opposite direction, actuators for said sets of conveying members respectively, and control means including a cyclically operated switch for causing said actuators to be operated so that said sets of load conveying members reach their upraised positions in sequence for conveying a load step-by-step along said bed.

19. In a conveyor the combination comprising a longitudinal bed, a first load conveying member on said bed, a second load conveying member on said bed adjacent to said first member, each of said load conveying members having a load engaging surface, means for guiding said first conveying member for angular movement upwardly from a seated position and in one direction along said bed, means for guiding said second conveying member for angular movement of the engaging surface upwardly from a seated position and in the opposite direction along said bed, said load conveying members having substantially the same upward limit of movement defining a plane of temporary load support, power actuators for moving the respective load conveying members between their limits of movement, and control means for cycling said power actuators so that the load engaging surfaces reach said plane of support in sequence for conveying a load step-by-step in one direction along said bed, said control means including means for reversing such sequence for carrying said load step-by-step in the opposite direction along said bed.

References Cited in the file of this patent
UNITED STATES PATENTS 2,622,401     Drago _____ Dec. 23, 1952